United States Patent
Kisaka

(10) Patent No.: US 7,031,096 B2
(45) Date of Patent: Apr. 18, 2006

(54) CENTER FREQUENCY ADJUSTMENT FOR A NOTCH FILTER

(75) Inventor: Masashi Kisaka, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 10/645,899

(22) Filed: Aug. 20, 2003

(65) Prior Publication Data

US 2004/0105294 A1    Jun. 3, 2004

(30) Foreign Application Priority Data

Aug. 23, 2002 (JP) ............................. 2002-244238

(51) Int. Cl.
*G11B 5/596* (2006.01)
(52) U.S. Cl. ................................. 360/77.04
(58) Field of Classification Search ............ 360/77.04, 360/77.02, 77.07, 78.04, 78.09; 327/556; 700/276
See application file for complete search history.

(56) References Cited

U.S. PATENT DOCUMENTS

| | | | | |
|---|---|---|---|---|
| 4,195,265 A | * | 3/1980 | Vali | 327/556 |
| 5,465,183 A | * | 11/1995 | Hattori | 360/78.09 |
| 6,246,536 B1 | * | 6/2001 | Galloway | 360/78.04 |
| 6,417,982 B1 | * | 7/2002 | Ottesen et al. | 360/77.02 |
| 6,690,534 B1 | * | 2/2004 | Ding et al. | 360/77.02 |
| 6,741,914 B1 | * | 5/2004 | Tze Ming Pang | 700/276 |
| 6,765,749 B1 | * | 7/2004 | Galloway et al. | 360/78.04 |
| 6,831,804 B1 | * | 12/2004 | Ooi et al. | 360/77.07 |
| 6,831,809 B1 | * | 12/2004 | Kagami et al. | 360/78.09 |

FOREIGN PATENT DOCUMENTS

| | | |
|---|---|---|
| JP | 01-230109 | 9/1989 |
| JP | 05-019858 | 1/1993 |
| JP | 05-047125 | 2/1993 |
| JP | 05-159492 | 6/1993 |
| JP | 05-313751 | 11/1993 |
| JP | 08-126370 | 5/1996 |
| JP | 11-096704 | 4/1999 |
| JP | 2001-005501 | 1/2001 |
| JP | 2001-195849 | 7/2001 |
| WO | WO 00/00966 | 1/2000 |

* cited by examiner

*Primary Examiner*—David Hudspeth
*Assistant Examiner*—Fred F. Tzeng
(74) *Attorney, Agent, or Firm*—Paik Saber; William D. Gill

(57) ABSTRACT

Disclosed is a data storage device, a servo control method, and a program to reduce effects of a resonance frequency of an actuator or the like without reduction in servo control performance. A band-pass filter comprising a first all pass filter (APF) and a second adder, a second APF, and a multiplier are used to detect how much a current resonance frequency of the actuator deviates from a set value of a center frequency of the first APF, and based on a result of the detection, the center frequency of the first APF is properly adjusted. The adjustment of the center frequency of first APF enables a center frequency of a notch filter comprising the first APF and a first adder to be automatically approximated to a current resonance frequency of the actuator.

11 Claims, 11 Drawing Sheets

(a)

(b)

CENTER FREQUENCY ADJUSTMENT FOR A NOTCH FILTER

BACKGROUND OF THE INVENTION

1. Field of the Invention

The present invention relates to data storage devices and, in particular, to suppression of mechanical resonance, and more particularly to suppression of mechanical resonance by using a notch filter.

2. Description of the Related Art

A hard disk drive widely used as an external storage device for a computer device is provided with a magnetic head for reading user data stored on a magnetic disk, or for writing user data on the magnetic disk. The magnetic head is attached to an actuator mechanism oscillated by a voice coil motor (VCM). When reading or writing of the user data is executed by the magnetic head, the actuator mechanism is driven to move and position the magnetic head on a specific track (target track). The magnetic head is controlled to move to a predetermined position based on servo information stored on the magnetic disk.

In the magnetic disk such as a hard disk, a plurality of data tracks are concentrically formed, and a servo track containing identification information and a burst pattern prestored therein is formed along a radial direction of the magnetic disk. The identification information and the burst pattern constitute the aforementioned servo information. The identification information indicates a track address of each data track. Based on the identification information read by the magnetic head, determination can be made as to an approximate position of the magnetic head, i.e., which of the data tracks the position of the magnetic head corresponds to. The burst pattern is made up of a plurality of burst pattern rows in which areas storing signals are arrayed at fixed intervals along the radial direction of the magnetic disk and phases of the signal storage areas are different from one another. Based on a signal (position error signal: PES) outputted from the magnetic head in accordance with the burst pattern, detection can be made as to a precise position of the magnetic head, i.e., deviation regarding how far the position of the magnetic head deviates from the corresponding data track.

The reading/writing of the user data with respect to the magnetic disk is executed in a rotating state of the magnetic disk, after the magnetic head is moved to correspond to a target track while the approximate position of the magnetic head is determined based on the identification information read by the magnetic head, and then the magnetic head is precisely positioned on the target track based on a signal outputted from the magnetic head in accordance with a burst pattern. This series of control is referred to as seek control. Additionally, even during the reading/writing of the user data, feedback control is executed for the target track based on PES so that the magnetic head can follow. This series of control is referred to as following control. These controls are examples of so-called servo control.

In such servo control, for example, when a mechanism of an actuator or the like mechanically resonates at a specific resonance frequency, amplitude of the resonance frequency is superposed on the PES, consequently creating a problem of instability of a seeking operation or a following operation of the magnetic head.

Thus, in the conventional hard disk drive, a notch filter of a center frequency equal to a resonance frequency is inserted into a servo loop, and a gain of the resonance frequency contained in a control signal is reduced by the notch filter, whereby the seeking operation and the following operation are stabilized.

However, there are a subtle individual differences among actuators, and the resonance frequency varies from actuator to actuator. Additionally, in the same actuator, the resonance frequency changes according to a temperature change. Now, if a resonance frequency of an actuator is markedly different from a cutoff frequency band around a center frequency set in the notch filter, abnormalities are exposed by inspection at the time of shipping, thus creating no problems. However, if the resonance frequency of the actuator deviates only slightly from the cutoff frequency band of the notch filter, it is difficult to discover abnormalities by inspection at the time of shipping, creating a concern of problem discovery after shipping. Recently in particular, because of narrow setting of a data track width so as to increase recording density, a servo band frequency must be increased so as to suppress effects of low frequency external disturbances, and effects of mechanical resonance at a relatively high frequency are conspicuous.

SUMMARY OF THE INVENTION

The present invention is designed to solve the foregoing technical problems, and it is an object of the invention to reduce effects of a resonance frequency of an actuator or the like without a reduction in servo control performance.

As a measure to counter such variance or changes in the resonance frequency of the actuator, the Q value of the notch filter may be set small to increase a cutoff frequency band width. However, the increased cutoff frequency band width of the notch filter results in an increase of a phase delay at the servo band frequency present at a frequency lower than the center frequency set in the notch filter, and the phase margin of the servo loop is thus reduced lowering servo control performance.

Therefore, the inventors have discovered that instead of increasing the cutoff frequency band width of the notch filter, the cutoff frequency itself should preferably be matched with a resonance frequency of an actual mechanical system to be actively changed, which has led to the present invention.

The data storage device of the present invention includes: an actuator for supporting and moving a head for reading/writing data on a recording medium; a servo control unit for feeding back a position error signal obtained by scanning the recording medium by the head to control an operation of the actuator; a notch filter for reducing the gain of a preset center frequency component from a servo signal transmitted from the servo control unit; deviation detecting means for detecting deviation of a resonance frequency of the actuator from a center frequency set in the notch filter; and changing means for changing a set value of the center frequency set in the notch filter based on a result of the deviation detection by the deviation detecting means.

In this case, the deviation detecting means preferably has a band-pass filter for passing a center frequency component corresponding to the resonance frequency from the servo signal transmitted from the servo control unit, a phase shifter for receiving a signal containing the resonance frequency as an input, and for shifting a phase at the resonance frequency of the signal by a predetermined amount, and a multiplier for multiplying the signal passed through the band-pass filter by the signal passed through the phase shifter. Moreover, preferably, the deviation detecting means further has an averaging unit for averaging output results of multiplication by the multiplier.

Additionally, the phase shifter preferably includes an all pass filter for generating a predetermined phase delay of 90 degrees.

Furthermore, the changing means preferably shifts the center frequency set in the notch filter to a low frequency side when a multiplication result by the multiplier exceeds a predetermined value, and to a high frequency side when the multiplication result by the multiplier drops below the predetermined value.

Then, preferably, the notch filter includes an all pass filter for passing the servo signal transmitted from the servo control unit, and a first adder for adding the signal passed through the all pass filter and the servo signal not passed through the all pass filter, and the band-pass filter includes the all pass filter, and a second adder for adding a negative value of the signal passed through the all pass filter and the servo signal not passed through the all pass filter.

The present invention can be understood as a program for causing a computer to realize: a function of extracting a resonance frequency of a structure contained in a servo signal; a function of detecting deviation of the resonance frequency from a center frequency set in a notch filter; and a function of shifting the center frequency of the notch filter to the resonance frequency side.

In this case, preferably, the function of extracting the resonance frequency of the structure contained in the servo signal passes the servo signal through a band-pass filter. The function of detecting the deviation of the resonance frequency from the center frequency set in the notch filter multiplies a signal of the extracted resonance frequency by a delay signal delaying a phase of the servo signal by 90 degrees, and the function of shifting the center frequency of the notch filter to the resonance frequency side shifts the center frequency set in the notch filter to a low frequency side when an output of the function of detecting deviation exceeds a predetermined value, and to a high frequency side when the output drops below the predetermined value.

Additionally, the function of detecting the deviation of the resonance frequency from the center frequency set in the notch filter averages output results of multiplication after the multiplication of the signal of the extracted resonance frequency by the delay signal delaying the phase of the servo signal by 90 degrees.

To cause the computer to execute the aforementioned functions, a program is stored in a storage medium to be read by the computer. The storage medium may be, for example a CD-ROM medium or the like. The program is read by a CD-ROM reader in the computer and, for example, a mode of the program stored in a hard disk drive or the like in the computer and may be executed. Additionally, for the programs, for example, a mode provided to a notebook PC or a portable terminal by a program transmitter through a network is conceivable. As such a program transmitter, it is only necessary for the transmitter to be provided with a memory for storing the program, and program transmitting means for providing the program through the network.

Furthermore, the present invention describes a method of carrying out the aforementioned functions of the program.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

First Embodiment

Figure 1:
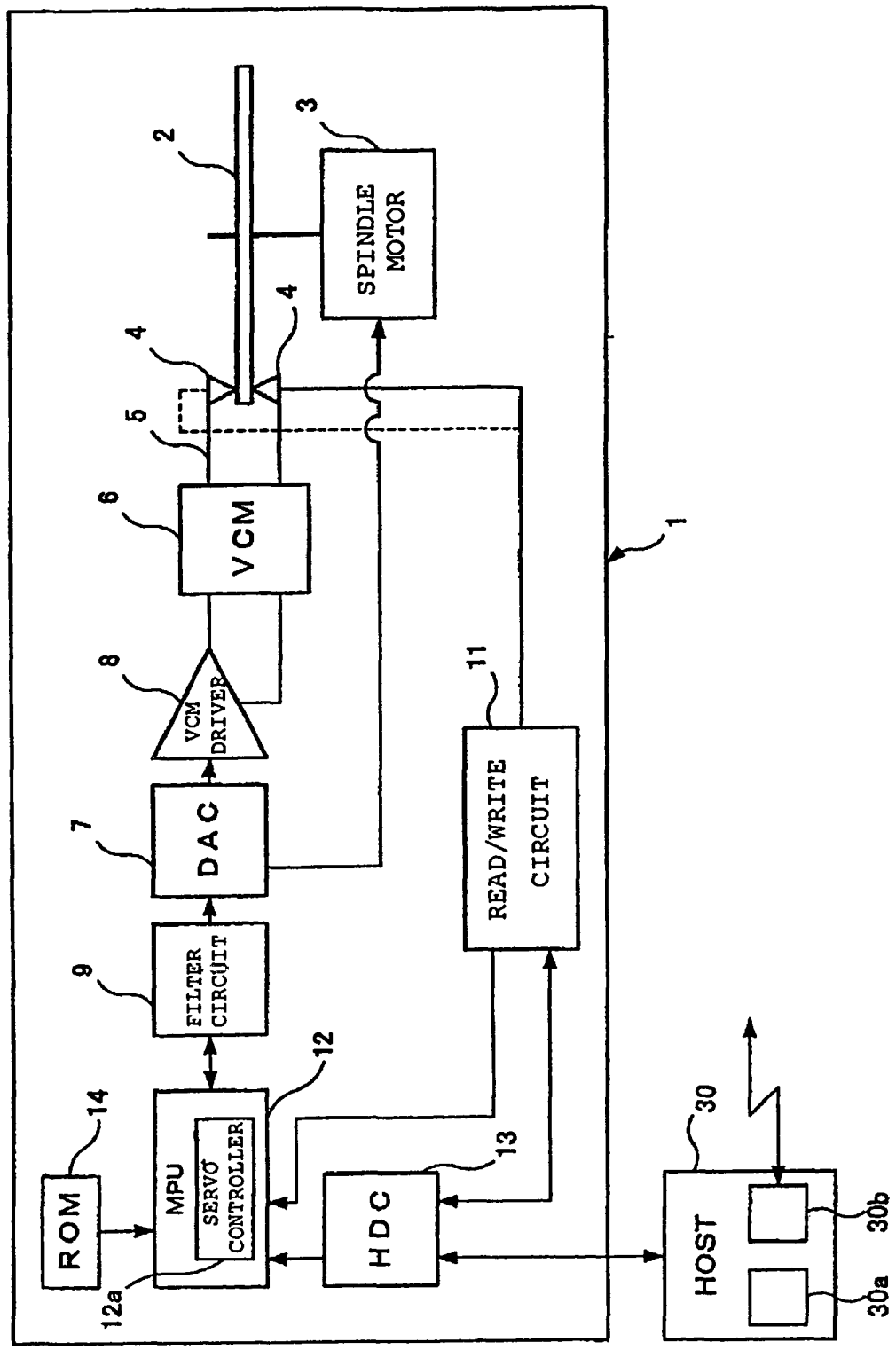
FIG. 1 is a block diagram showing main sections of a hard disk drive according to a first embodiment.

FIG. 1 is a block diagram showing main sections of a hard disk drive 1 according to a first embodiment. The hard disk drive 1 has a magnetic disk 2, a spindle motor 3, a magnetic head 4, an actuator 5, a voice coil motor (VCM) 6, a digital/analog converter (DAC) 7, a VCM driver 8, a filter circuit 9, a read/write circuit 11, a micro processing unit (MPU) 12, a hard disk controller (HDC) 13, and a read only memory (ROM) 14. The hard disk drive 1 is connected through the HDC 13 to a host computer (HOST) 30. The hard disk drive 1 is a storing/reproducing device in which the magnetic head 4 seeks on the magnetic disk 2 rotary-driven by the spindle motor 3 and stays on a predetermined track (target track) to write data on the magnetic disk 2 or read data written on the magnetic disk 2. A single or a plurality of magnetic disks 2 are loaded as necessary. An example of a single magnetic disk 2 is shown in FIG. 1.

While the hard disk drive 1 is operating, the magnetic disk 2 is rotated on a spindle shaft of the spindle motor 3, and its rotation is stopped (stationary) when the hard disk drive 1 is not operating.

Two magnetic heads 4 are held on a tip of the actuator 5 to access the front and back surfaces of the magnetic disk 2. The magnetic head 4 writes/reads data to or from the magnetic disk 2. The magnetic head 4 also reads servo information stored on the magnetic disk 2. The servo information will be described later. The magnetic head 4 is moved in a radial direction on the magnetic disk 2 integrally with the actuator 5. A ramp (not shown) for unloading from the disk when the magnetic head 4 is not driven is disposed outside the magnetic disk 2.

The actuator 5 is driven by the VCM 6. Accordingly, it can be said that the VCM 6 drives the magnetic head 4. The VCM 6 comprises a rotor using a coil as an element, and a stator using a permanent magnet as an element. Predetermined current is supplied from the VCM driver 8 to the coil to drive the rotor, whereby the magnetic head 4 is moved toward the target track on the magnetic disk 2. The actuator 5 has a resonance frequency of 10500 Hz in a normal state.

The read/write circuit 11 executes data reading/writing. That is, write data transferred from the HOST 30 through the HDC 13 is converted into a write signal (current) to be supplied to the magnetic head 4. The magnetic head 4 writes data on the magnetic disk 2 based on the write current. On the other hand, a read signal (current) read from the magnetic disk 2 is converted into digital data to be outputted through the HDC 13 to the HOST 30. The digital data contains servo information.

The HDC 13 has interface functions to the hard disk drive 1. As one of such functions, the write data transferred from the HOST 30 is received, and also transferred to the read/write circuit 11. Additionally, the read data transferred from the read/write circuit 11 is transferred to the HOST 30. Furthermore, a command or the like is received from the HOST 30 to transfer the read data to the MPU 12.

The MPU 12 controls the hard disk drive 1. The MPU 12 has a function as a servo controller 12a, and also executes movement control of the magnetic head 4, in other words, seek control or following control. The MPU 12 interprets and executes a program stored in the ROM 14. The MPU 12 (servo controller 12a) determines a position of the magnetic head 4 based on the servo information transferred from the read/write circuit 11, and outputs a speed control value of the magnetic head 4 to the DAC 7 based on deviation of the determined position of the magnetic head 4 with respect to a target position. The speed control value as a movement command of the magnetic head 4 is outputted for each reading of the servo information by the magnetic head 4.

The DAC 7 converts the speed control value outputted from the magnetic head 4 into an analog signal (voltage signal), and outputs it to the VCM driver 8.

The VCM driver 8 converts the voltage signal received from the DAC 7 into driving current, and supplies it to the VCM 6.

The filter circuit 9 has a function of reducing a gain of a resonance frequency of the actuator 5 contained in the speed control value, and passes the speed control value of the reduced gain of the resonance frequency of the actuator 5 to the DAC 7. The filter circuit 9 also has a function of detecting a difference between the set resonance frequency of the actuator 5 and an actual resonance frequency, and feeds back a detected value to the MPU 12 (servo controller 12a). The filter circuit 9 will be described in detail later.

The HOST 30 has a disk drive 30a for reading a program or data recorded in a disk medium such as a CD-ROM or a DVD read only memory (DVD-ROM), and a network interface (NI/F) 30b for communicating with an external network or downloading various programs.

Figure 2:
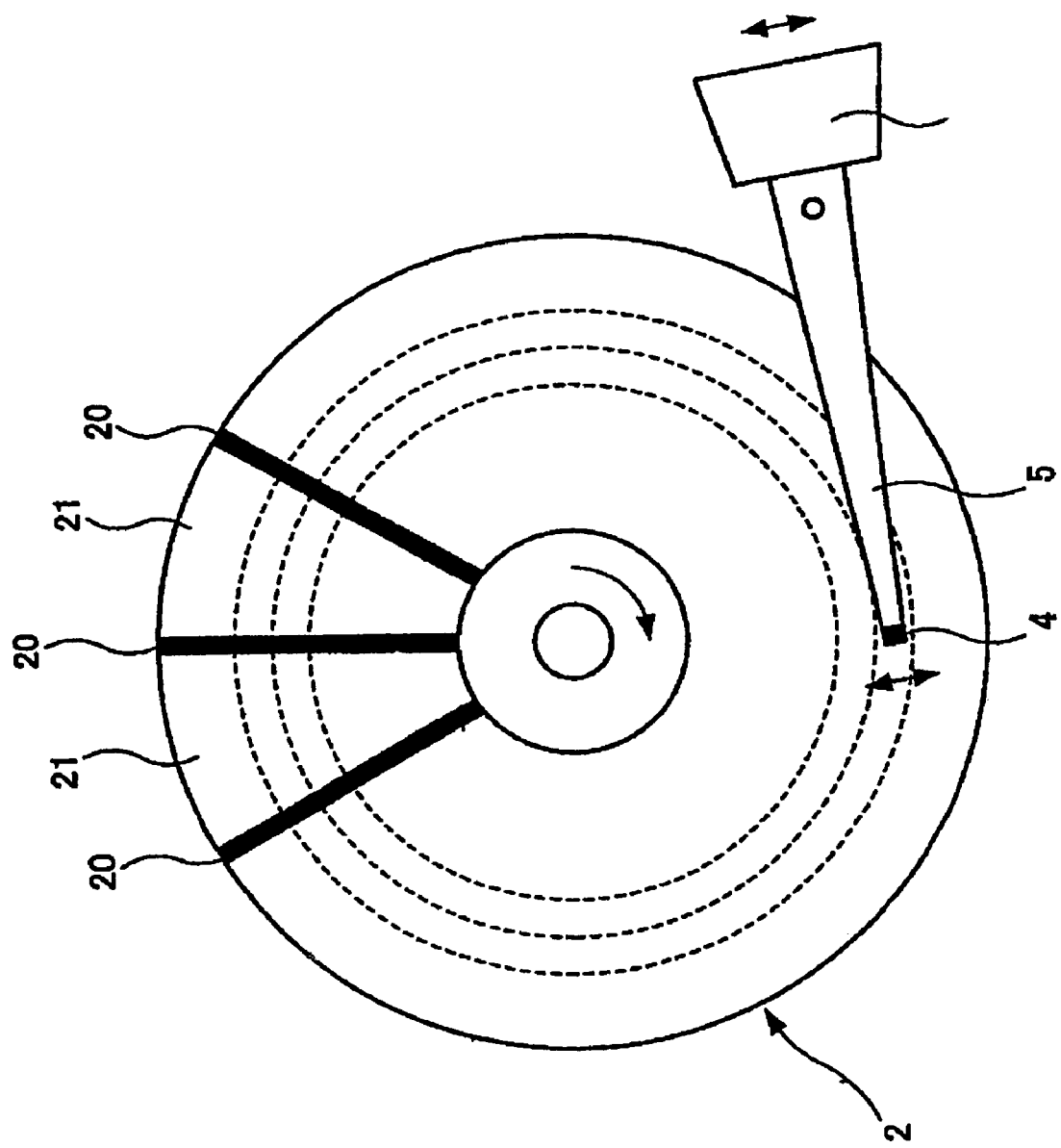
FIG. 2 is an explanatory view showing a storage surface of a magnetic disk.

FIG. 2 shows a storage surface (one surface side) of the magnetic disk 2. On the surface of the magnetic disk 2, a plurality of position information (servo information) storage areas 20 are radially formed along the radial direction of the magnetic disk 2, and data storage areas 21 are formed in other areas. FIG. 2 shows three position information storage areas 20 and data storage areas 21 held therebetween. However, actually, many more position information areas 20 and data storage areas 21 are formed in a circumferential direction of the magnetic disk 2. The servo information stored in the position information storage area 20 is read by the magnetic head 4, whereby a position of the magnetic head 4 is determined. The servo information comprises track identification data and a burst pattern. The track identification information indicates a track address of each data track. The track identification information is read by the magnetic head 4, whereby a track position in which the magnetic head 4 is currently located can be determined. The burst pattern has areas storing respective signals arrayed at fixed intervals along the radial direction of the magnetic disk 2, and comprises a plurality of signal storage area rows in which phases of signal storage areas are different from one another. Based on a signal outputted from the burst pattern, it is possible to determine the amount of deviation of the magnetic head 4 with respect to the data track.

Figure 3:
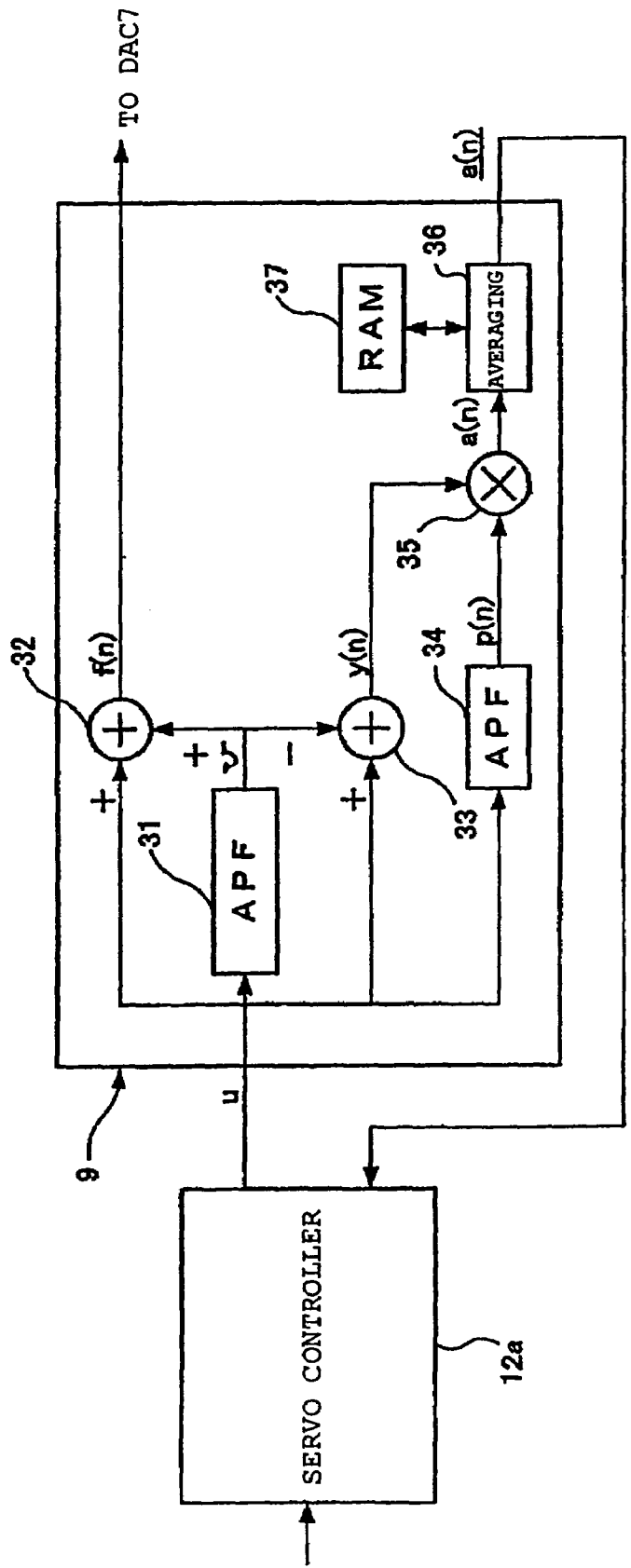
FIG. 3 is an explanatory view showing a filter circuit used in the first embodiment.

FIG. 3 specifically shows the filter circuit 9. This filter circuit 9 has an all pass filter (APF) 31 to which a speed control value u outputted from the servo controller 12a is entered, and a first adder 32 for adding the speed control value u from the servo controller 12a and an APF passed signal v passed through the first APF 31. An output f(n) of the first adder 32 is outputted as a speed control value to the DAC 7. Incidentally, the speed control value u is a value set by the servo controller 12a based on the servo information read by the magnetic head 4, and is a current value for controlling the moving speeds of actuator 5 and the magnetic head 4 attached thereto.

Additionally, the filter circuit 9 has a second adder 33 for adding the speed control value u and a negative component −v of the APF passed signal v passed through the first APF 31, a second APF 34 to which the speed control value u is entered, a multiplier 35 for multiplying an output y(n) of the second adder 33 by an output p(n) of the second APF 34, an averaging unit 36 for averaging outputs a(n) of the multiplier 35, and a RAM 37 for temporarily storing past outputs a(n−1), a(n−2) . . . of the multiplier 35. The output a(n) of the averaging unit 36 is fed back to the servo controller 12a.

Figure 4:
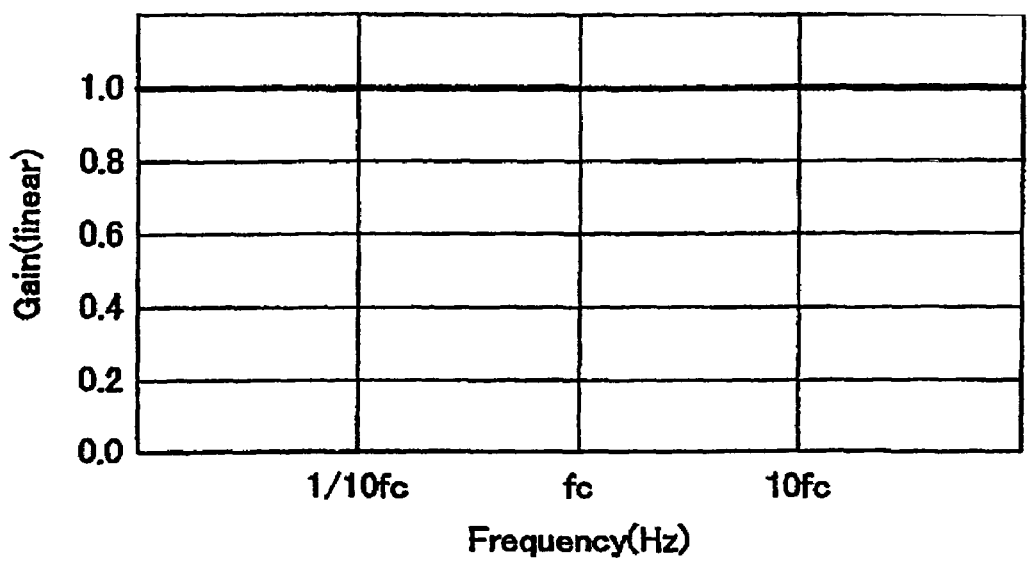
FIGS. 4(a) and 4(b) are graphs respectively showing a frequency-gain characteristic of an APF, and a frequency-phase characteristic of the APF.
Figure 4:
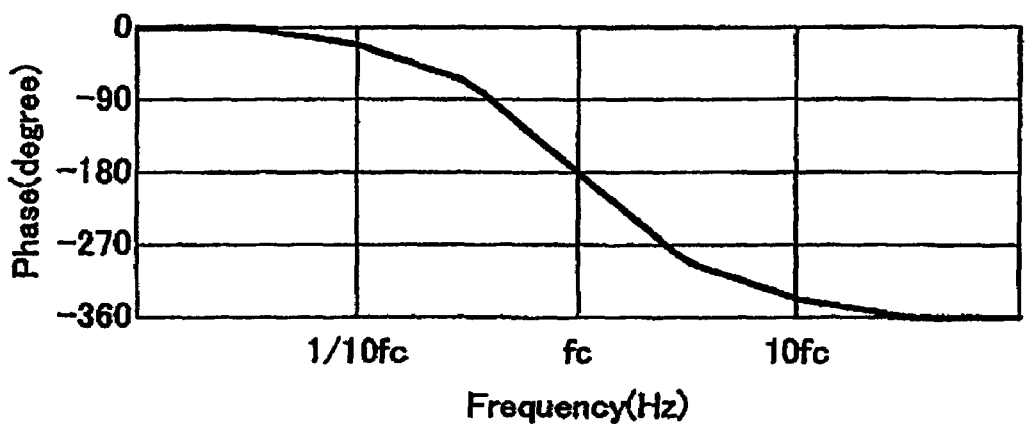

FIGS. 4(a) and 4(b) are graphs respectively showing a frequency-gain characteristic of the first APF 31, and a frequency-phase characteristic of the first APF 31. In the embodiment, the APF 31 is a digital filter. In the APF 31, as clearly seen from FIGS. 4(a) and 4(b), a gain with respect to a frequency is roughly constant, while a phase with respect to the frequency is changed from 0 to −360 degrees as a function of frequency. The APF 31 outputs an output v having a phase delay of 180 degrees generated with respect to the speed control value u at a center frequency fc. A transmission function H(z) of the APF 31 is represented by the following equation:

Equation 1:

$$H(z) = \frac{a_2 z^2 + a_1(1+a_2)z + 1}{z^2 + a_1(1+a_2)z + a_2}$$

where, $a_1 = -\cos(\omega_0 T_s)$ $\omega_0$: center frequency $T_s$: sampling time In the embodiment, the center frequency fc of the APF 31 can be varied and, in an initial state, it is set to 10500 Hz equal to the normal resonance frequency of the actuator 5 (see FIG. 1).

Figure 5:
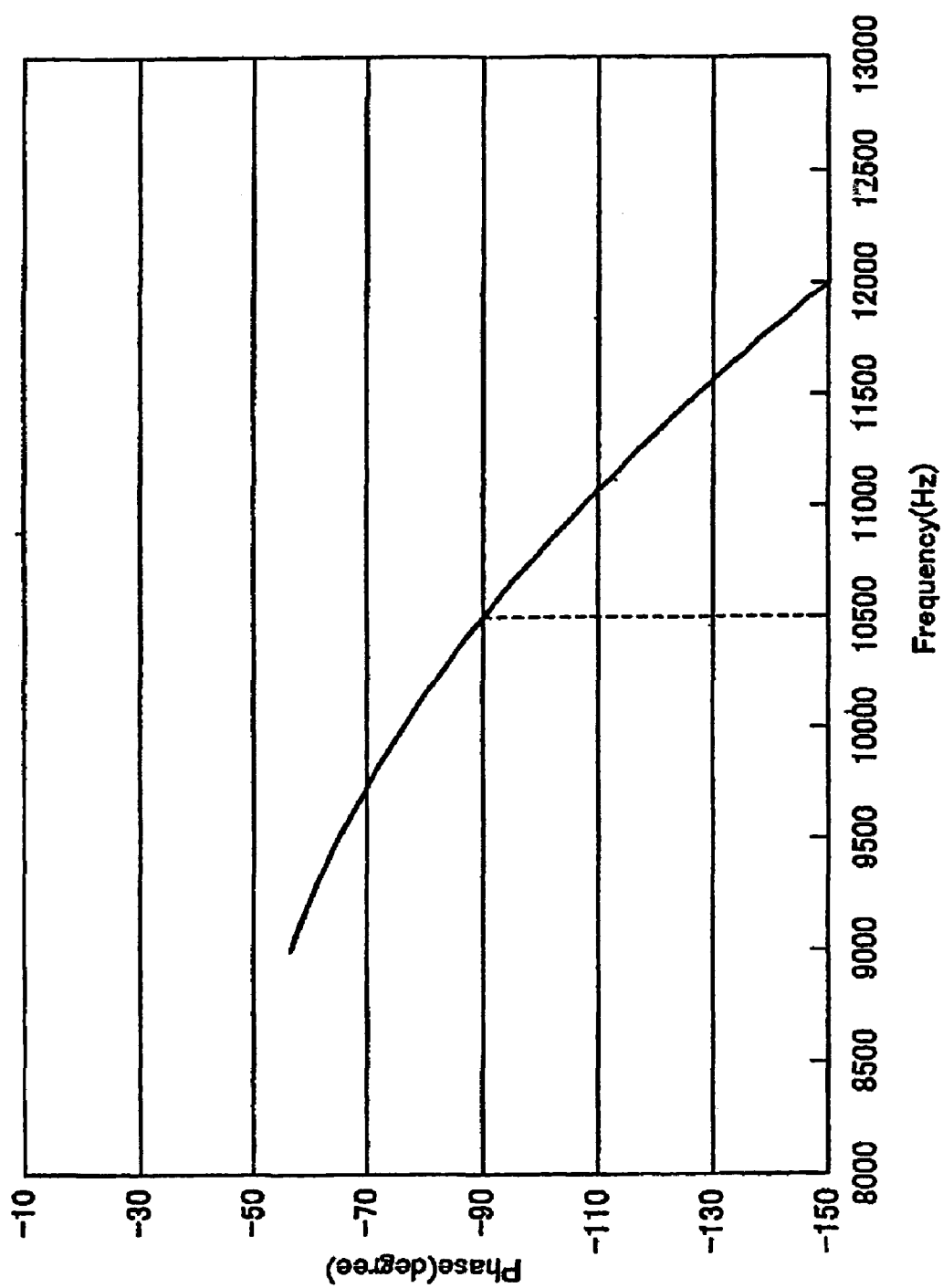
FIG. 5 is a graph showing a frequency-phase characteristic of another APF.

FIG. 5 is a graph showing a frequency-phase characteristic of the second APF 34. In the embodiment, the second APF 34 is also a digital filter. A frequency of the second APF 34 generating a phase delay of 90 degrees is set to 10500 Hz equal to the center frequency of the first APF 31. That is, in the embodiment, the second APF 34 is operated as a phase shifter for shifting a phase.

Figure 6:
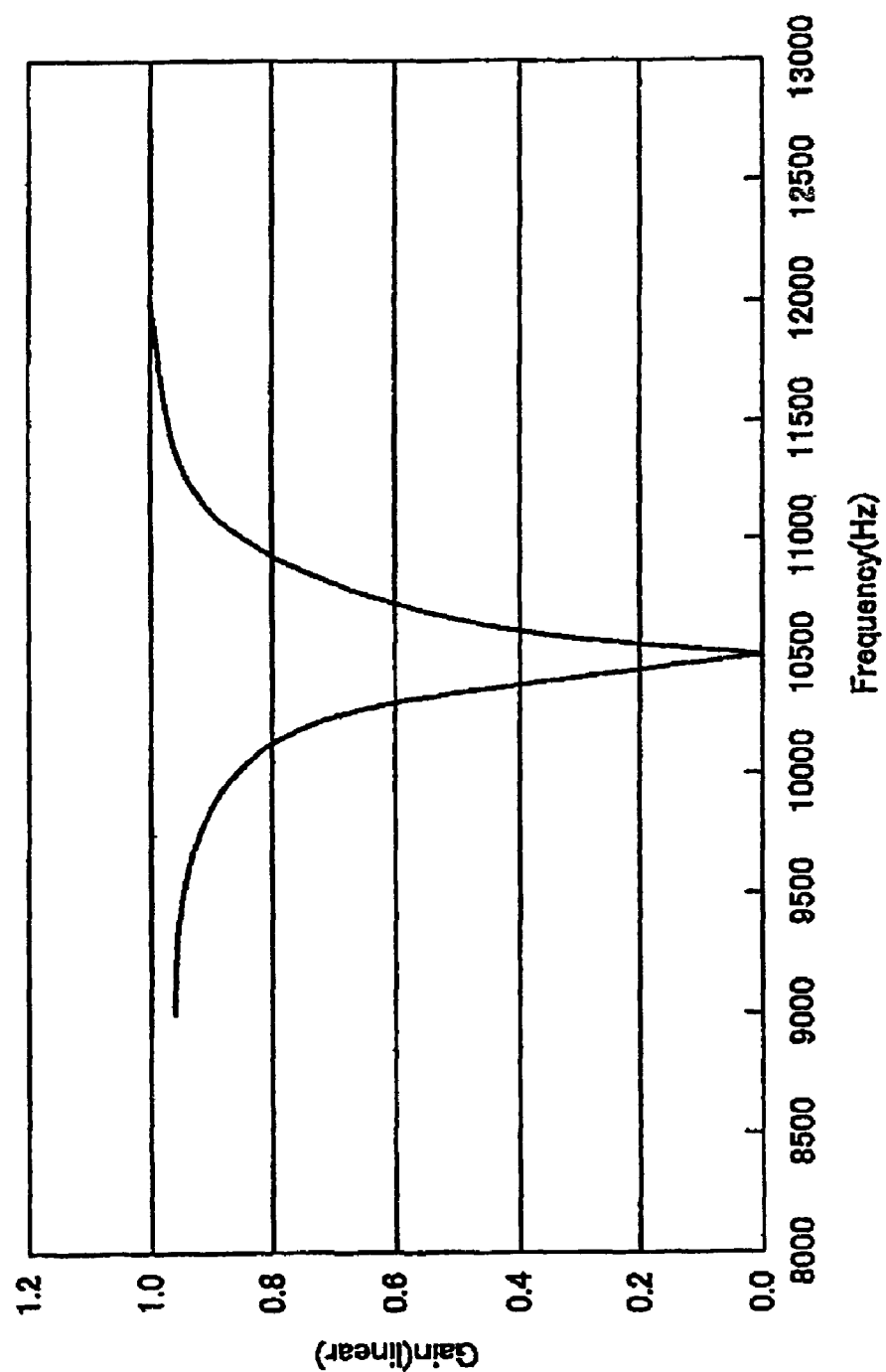
FIG. 6 is a graph showing a frequency-gain characteristic of a notch filter comprising an APF and a first adder.

In FIG. 3, the first adder 32 adds the speed control value u from the servo controller 12a and the APF passed signal v passed through the APF 31. As shown in FIG. 4(b), the APF passed signal v has a phase delay of 180 degrees generated with respect to the speed control value u at a cutoff frequency fc (10500 Hz). Accordingly, a frequency-gain characteristic of an output f(n) from the first adder 32 becomes, as shown in FIG. 6, one having a notch formed in which 10500 Hz is set as a center frequency and a frequency component around it is also reduced slightly. That is, the first APF 31 and the first adder 32 constitute a notch filter having 10500 Hz set as a center frequency. Thus, the speed control value u outputted from the servo controller 12a is outputted to the DAC 7 in a state where a gain at a frequency (corresponding to the resonance frequency of the actuator 5) in the vicinity of 10500 Hz is reduced by the notch filter. A transmission function H(z) of the notch filter is represented by the following equation. Incidentally, FIG. 6 shows a relation when sampling time is 39.68 microseconds, and $a_2=0.88205$.

Equation 2:

$$H(z) = \frac{1}{2}(1+a_2)\frac{z^2 + 2a_1 z + 1}{z^2 + a_1(1+a_2)z + a_2}$$

Figure 7:
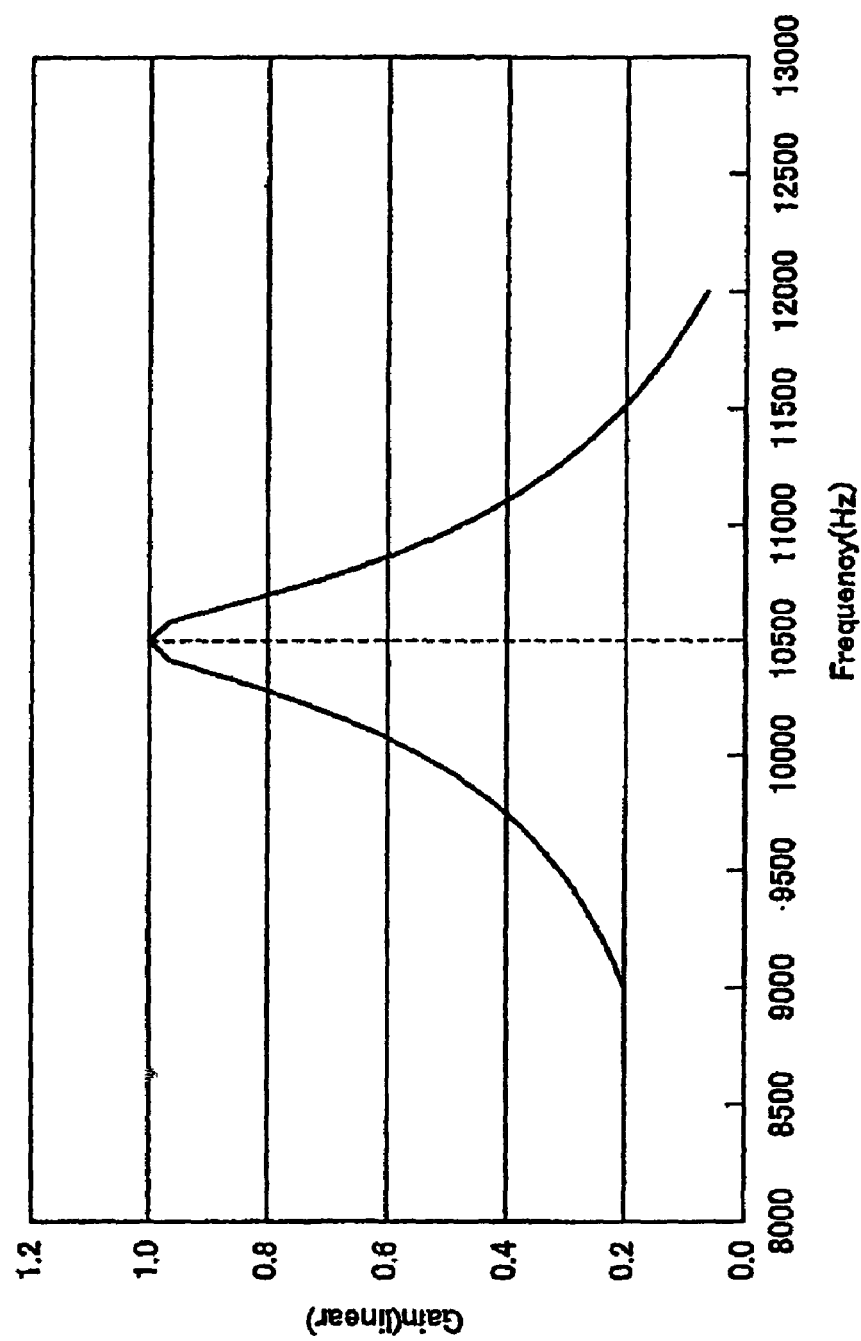
FIG. 7 is a graph showing a frequency-gain characteristic of a band-pass filter comprising an APF and a second adder.
Figure 8:
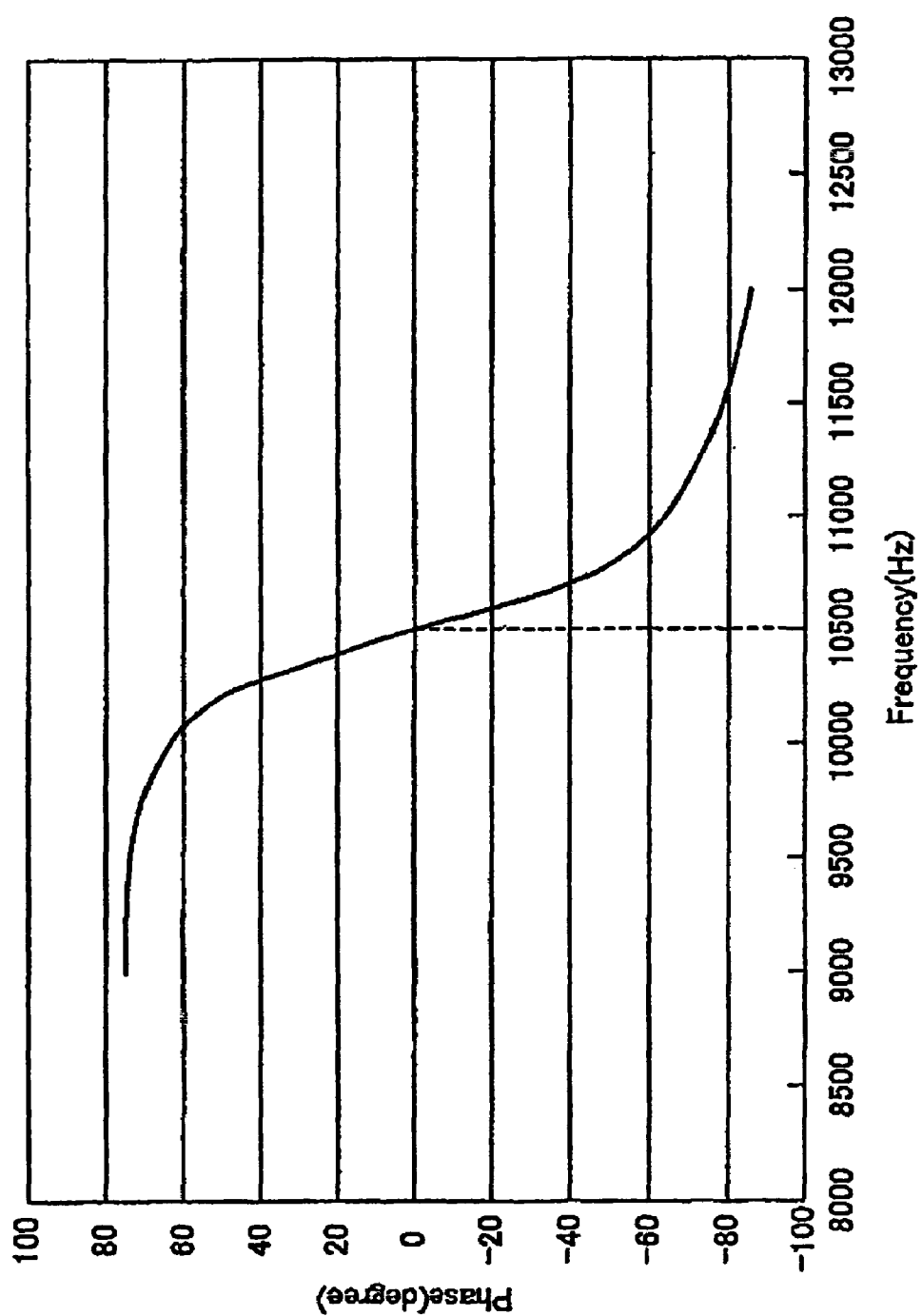
FIG. 8 is a graph showing a frequency-phase characteristic of the band-pass filter comprising the APF and the second adder.

The second adder 33 adds the speed control value u from the servo controller 12a and the negative component −v of the APF passed signal v passed through the first APF 31. In other words, a difference between the speed control value u and the APF passed signal v is calculated. As shown in FIG. 4(b), the APF passed signal v has a phase delay of 180 degrees generated with respect to the speed control value u at the cutoff frequency fc (10500 Hz). Accordingly, a frequency-gain characteristic of an output y(n) from the second adder 33 becomes, as shown in FIG. 7, one having a peak formed in which 10500 Hz is set as a center frequency, and a frequency component around it is also passed a little. A frequency-phase characteristic of the output y(n) has, as shown in FIG. 8, a feature that an advance delay of the phase disappears at 10500 Hz, the phase advances at a frequency below 10500 Hz, and the phase delays at a frequency exceeding 10500 Hz. That is, the first APF 31 and the second adder 33 comprise a band-pass filter having 10500 Hz set as a center frequency. Accordingly, the speed control value u outputted from the servo controller 12a is outputted to the multiplier 35 in a state where only a frequency (corresponding to the resonance frequency of the actuator 5) in the vicinity of 10500 Hz is passed by the band-pass filter.

Furthermore, the multiplier 35 multiplies the output y(n) of the second adder 33 by the output p(n) of the second APF 34. As shown in FIG. 5, the output p(n) of the second APF 34 has a phase delay of 90 degrees generated with respect to the speed control value u at the frequency of 10500 Hz.

Therefore, when a gain of the band-pass filter comprising first APF 31 and the second adder 33 is X, a phase at this time is Y, a phase delay by the second APF 34 is $Z-\pi/2$, and an input to the band-pass filter is sin(wt), then the output y(n) of the band-pass filter becomes $$y(n)=X\sin(\omega t+Y),$$

the output p(n) of the second APF 34 becomes $$p(n)=\sin(\omega t+Z-\pi/2)=-\cos(\omega t+Z),$$

and a product a(n) thereof becomes $$a(n)=-X/2\{\sin(Y-Z)+\sin(2\omega t+Y+Z)\}.$$

Figure 9:
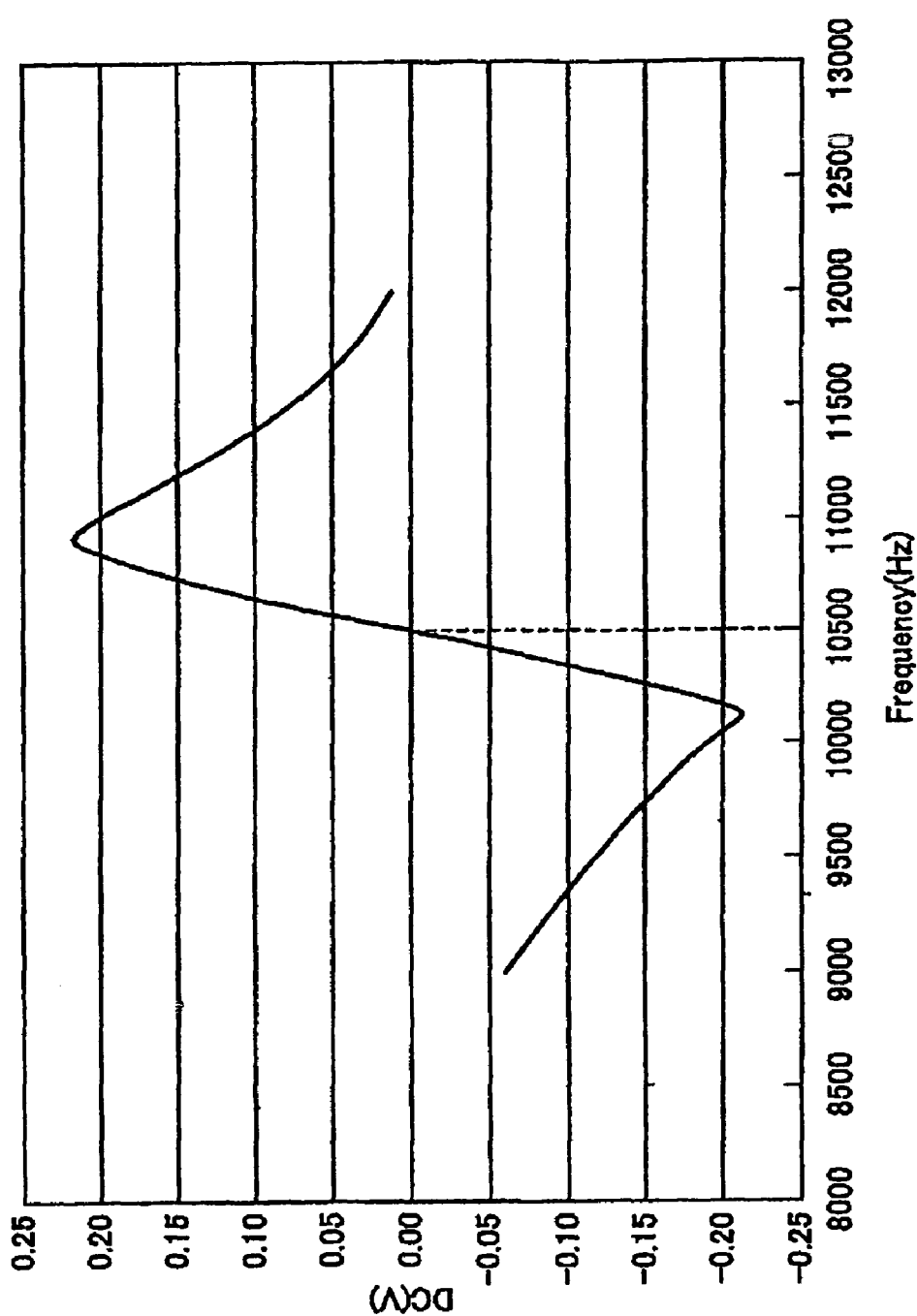
FIG. 9 is a graph showing a frequency-output voltage characteristic of a multiplier.

A DC component in this case is decided by the gain of the band-pass filter and the phase of the second APF 34. Thus, voltage a(n) outputted from the multiplier 35 is, as shown in FIG. 9, 0 at a frequency of 10500 Hz, negative at a frequency below 10500 Hz, and positive at a frequency exceeding 10500 Hz. That is, the voltage a(n) exhibits a negative value when a real resonance frequency of the actuator 5 is below 10500 Hz, and a positive value when a real resonance frequency of the actuator exceeds 10500 Hz.

Furthermore, the averaging unit 36 calculates an average among past output voltages a(n−1), a(n−2) . . . of the multiplier 35 accumulated in the RAM 37 and currently outputted output voltage a(n), and outputs it as an average output a(n). In the embodiment, an average value a(n) is calculated based on the past five output voltages a(n−1) to a(n−5) and the current output voltage a(n).

Figure 10:
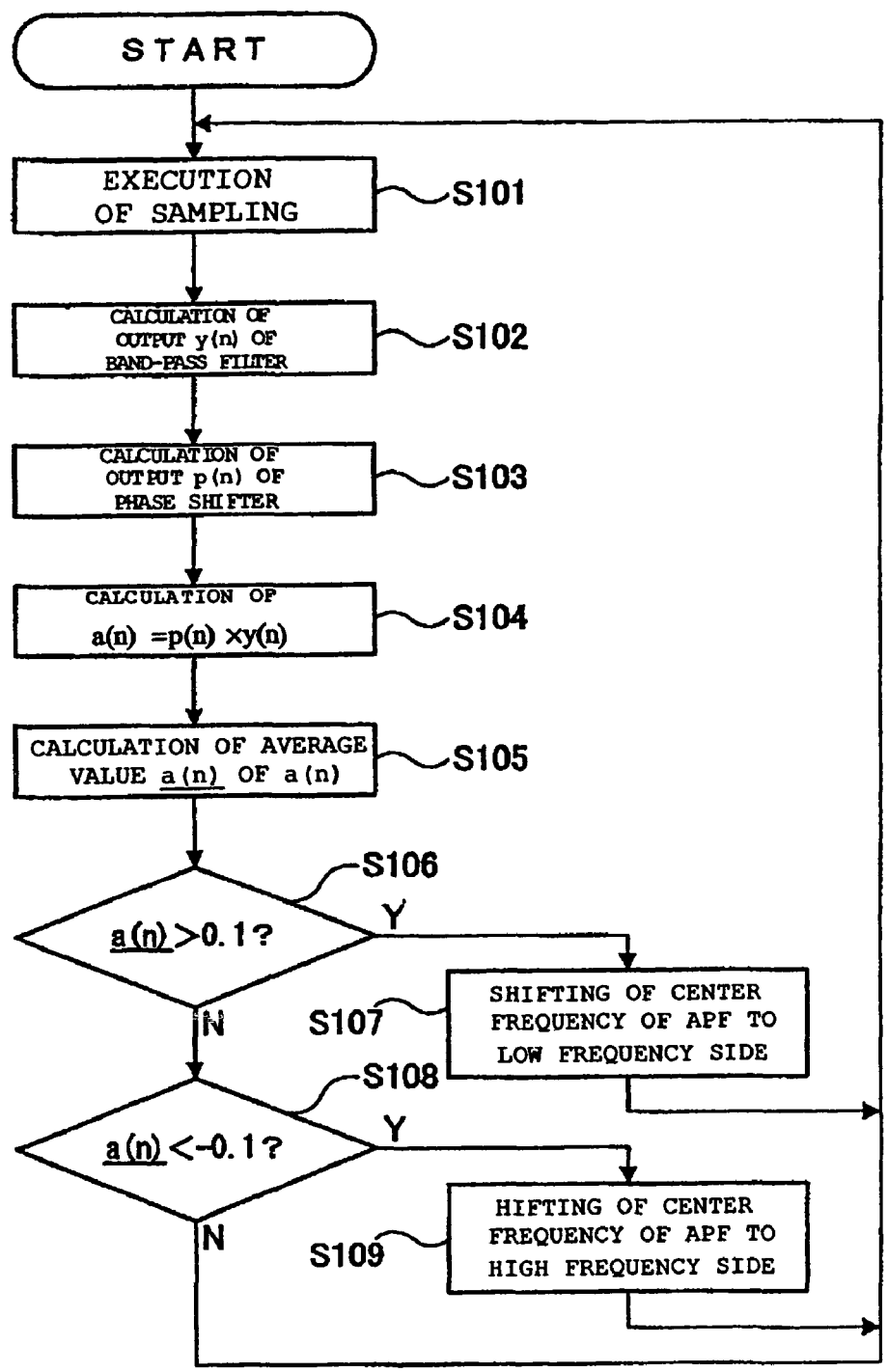
FIG. 10 is a flowchart showing a feedback control process by the filter circuit and a servo controller.

FIG. 10 is a flowchart showing a feedback control process by the filter circuit 9 and the servo controller 12a.

First, at the first APF 31, servo sampling is executed at a predetermined timing (step S101), and then an output y(n) is calculated by the band-pass filter (comprising the APF 31 and the second adder 33) (step S102).

Subsequently, a value sampled in step S101 is entered to the second APF 34, an output p(n) is calculated at the second APF 34 (step S103), and a(n), i.e., p(n)×y(n) is calculated by the multiplier 35 (step S104).

Furthermore, an average output a(n) is calculated based on the output a(n) and the past outputs a(n−1) to a(n−5) stored in the RAM 37 (step S105).

Then, when the average output a(n) is returned to the servo controller 12a, first, determination is made as to whether the average output a(n) is larger than 0.1 (V) or not (step S106). If the average output a(n) is determined to be larger than 0.1 (V), a control signal is sent to the first APF 31 so as to shift a center frequency of the APF 31 comprising the notch filter to a low frequency side by a predetermined value (e.g., 10 Hz) (step S107), and the process returns to step S101.

On the other hand, if the average output a(n) is determined to be smaller than 0.1 V in step S106, determination is then made as to whether the average output a(n) is smaller than −0.1 V or not (step S108). If the average output a(n) is determined to be smaller than −0.1 V, a control signal is sent to the first APF 31 so as to shift a center frequency of the APF 31 comprising the notch filter to a high frequency side by a predetermined value (e.g., 10 Hz) (step S109), and then the process returns to step S101. If the average output a(n) is determined to be larger than −0.1 V in step S108, the process directly returns to step S101 without changing the center frequency of the APF 31 comprising the notch filter.

According to the embodiment, the band-pass filter comprising the APF 31 and the second adder 33, the second APF 34, and the multiplier 35 are used to detect how much the current resonance frequency of the actuator 5 deviates from the set value of the center frequency of the first APF 31. Based on this detected result, the center frequency of the APF 31 is properly adjusted. The adjustment of the center frequency of the APF 31 enables the center frequency set in the notch filter comprising the APF 31 and the first adder 32 to be automatically approximated to the current resonance frequency of the actuator 5. Thus, even if fluctuation occurs in the resonance frequency of the actuator 5 for any reason, the gain at the resonance frequency of the actuator 5 contained in the speed control value u can be reduced by the notch filter of the adjusted center frequency to be outputted to the DAC 7, whereby a reduction in the servo control performance can be suppressed.

Additionally, according to the embodiment, since the average value a(n) among the output a(n) from the multiplier 35 and the past outputs a(n−1) to a(n−5) is fed back to the servo controller 12a, it is possible to reduce errors in servo control.

Furthermore, since the aforementioned adjusting operation of the resonance frequency and the center frequency is executed in the background of the actual operation, the necessity of specially setting execution time of frequency adjustment can be advantageously eliminated.

Incidentally, according to the embodiment, the servo controller 12a is incorporated in the MPU 12, and the filter circuit 9 is separate from the MPU 12 (and servo controller 12a). However, the design is not limited to this, and the filter circuit 9 may be incorporated as one of the functions of the MPU 12.

Additionally, according to the embodiment, the first APF 31, the second APF 34 or the like comprise digital filters. However, there are no limitations in this regard, and the APF 31 and APF 34 may comprise analog filters. According to the embodiment, the input to the APF 34 is the speed control value u. However, the input is not limited to this value, and a similar result can be obtained in the case of the output y(n) from the band-pass filter.

Furthermore, the embodiment has been described by way of example of a hard disk drive 1. However, the invention is not limited to this, and it can be similarly applied to, for example a data storage device such as an optical disk drive for reading/writing data in an optical disk (corresponding to the recording medium) by using an optical pickup (corresponding to the head) attached to the actuator 5.

Moreover, the embodiment has been described by way of example of the reduction in the gain at the resonance frequency of the actuator 5. However, the invention is not limited to this, and similar technique can be applied to a case of reducing effects of a resonance frequency of other structures comprising the hard disk drive 1.

Second Embodiment

Figure 11:
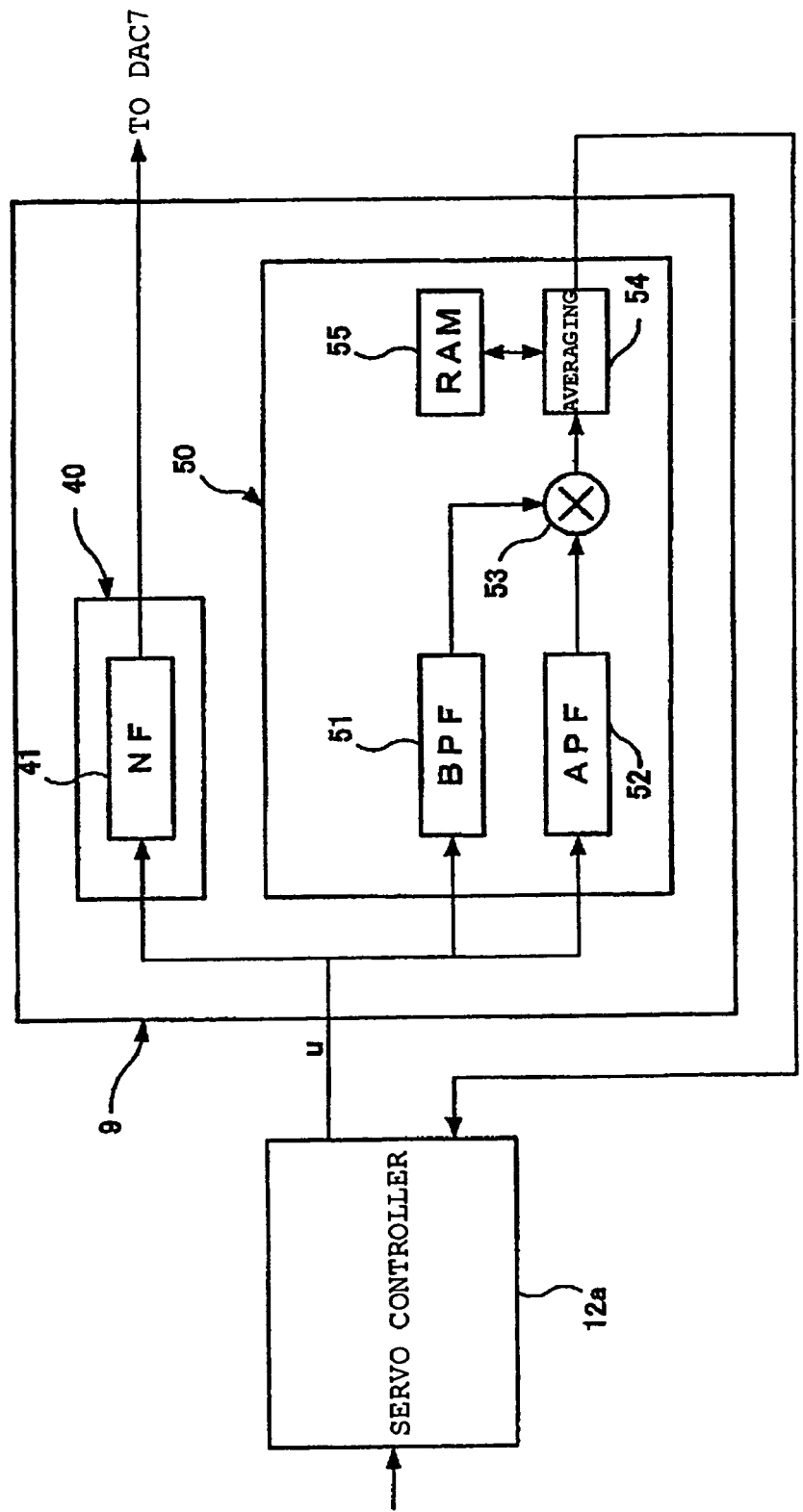
FIG. 11 is an explanatory view showing a filter circuit used in a second embodiment.

FIG. 11 shows a filter circuit 9 according to a second embodiment. This embodiment is roughly similar to the first embodiment, but different in that a notch filter and a band-pass filter are individually formed instead of realizing the notch filter and the band-pass filter by all pass filters (APF) and adders. Portions of the embodiment similar to those of the first embodiment are denoted by the same reference numerals as those of the first embodiment, and detailed description will be omitted.

The filter circuit 9 according to the embodiment is provided with a notch filter (NF) circuit 40 having an NF 41, a band-pass filter (BPF) 51, an all pass filter (APF) 52, a multiplier 53, an averaging unit 54, and a BPF circuit 50 having a RAM 55. Then, an output of the NF circuit 40 is connected to a DAC 7 (see FIG. 1), and an output of the BPF circuit 50 is fed back to a servo controller 12a.

According to the embodiment, detection is made by the BPF circuit 50 as to how much a current resonance frequency of the actuator 5 (see FIG. 1) deviates from a set value of a center frequency in the NF 41, and the center frequency of the NF 41 in the NF circuit 40 is properly adjusted based on a result of the detection, whereby it can be automatically approximated to the current resonance frequency of the actuator 5, similarly to the first embodiment. Accordingly, even if fluctuation occurs in the resonance frequency of the actuator 5 for any reason, at the NF 41 of the adjusted center frequency, a gain at the resonance frequency of the actuator 5 contained in a speed control value u can be reduced to be outputted to the DAC 7. Therefore, it is possible to suppress a reduction in servo control performance.

As described above, according to the present invention, it is possible to reduce the effects of a resonance frequency of an actuator or the like without reduction in the servo control performance.

Although the preferred embodiments of the present invention have been described in detail, it should be understood that various changes, substitutions and alterations can be made therein without departing from spirit and scope of the invention as defined by the appended claims.

What is claimed is:

1. A data storage device comprising:
    an actuator for supporting and moving a head for reading and writing data with respect to a recording medium;
    a servo control unit for feeding back a position error signal obtained by scanning the recording medium by the head to control an operation of the actuator;
    a notch filter for reducing a gain of a preset center frequency component from a servo signal transmitted from the servo control unit;
    deviation detecting means for detecting deviation of a resonance frequency of the actuator from a center frequency set in the notch filter; wherein the deviation detecting means comprises:
        a band-pass filter for passing a center frequency component corresponding to the resonance frequency from the servo signal transmitted from the servo control unit;
        a phase shifter for receiving a signal containing the resonance frequency as an input, and for shifting a phase at the resonance frequency of the signal by a predetermined amount; and
        a multiplier for multiplying the signal passed through the band-pass filter by the signal passed through the phase shifter; and
    changing means for changing a set value of the center frequency set in the notch filter based on a result of the deviation detection by the deviation detecting means.

2. The data storage device according to claim 1, wherein the deviation detecting means further has an averaging unit for averaging output results of multiplication by the multiplier.

3. The data storage device according to claim 1, wherein the phase shifter comprises an all pass filter for generating a phase delay of 90 degrees as the predetermined amount.

4. The data storage device according to claim 1, wherein the changing means shifts the center frequency set in the notch filter to a low frequency side when a multiplication result by the multiplier exceeds a predetermined value, and to a high frequency side when the multiplication result by the multiplier drops below the predetermined value.

5. The data storage device according to claim 1, wherein the notch filter includes an all pass filter for passing the servo signal transmitted from the servo control unit, and a first adder for adding the signal passed through the all pass filter and the servo signal not passed through the all pass filter, and the band-pass filter includes the all pass filter, and a second adder for adding a negative value of the signal passed through the all pass filter and the servo signal not passed through the all pass filter.

6. A servo control method comprising:
extracting a resonance frequency of a structure contained in a servo signal;
detecting deviation of the resonance frequency from a center frequency set in a notch filter; and
shifting the center frequency of the notch filter to the resonance frequency side; and
wherein the servo signal is passed through a band-pass filter.

7. The servo control method according to claim 6, wherein a signal of the extracted resonance frequency is multiplied by a delay signal delaying the phase of the servo signal by 90 degrees, and the center frequency set in the notch filter is shifted to a low frequency side when an the deviation of the resonance frequency exceeds a predetermined value, and to a high frequency side when the deviation of the resonance frequency drops below the predetermined value.

8. The servo control method according to claim 7, wherein after the multiplication of the signal of the extracted resonance frequency by the delay signal delaying the phase of the servo signal by 90 degrees, output results of multiplication are averaged.

9. A computer program comprising:
a means of extracting a resonance frequency of a structure contained in a servo signal;
a means of detecting deviation of the resonance frequency from a center frequency set in a notch filter; and
a means of shifting the center frequency of the notch filter to the resonance frequency side; and
wherein the means of extracting the resonance frequency of the structure contained in the servo signal passes the servo signal through a band-pass filter.

10. The computer program according to claim 9, wherein the means of detecting the deviation of the resonance frequency from the center frequency set in the notch filter multiplies a signal of the extracted resonance frequency by a delay signal delaying a phase of the servo signal by 90 degrees, and the means of shifting the center frequency of the notch filter to the resonance frequency side shifts the center frequency set in the notch filter to a low frequency side when an output of the detecting deviation exceeds a predetermined value, and to a high frequency side when the output drops below the predetermined value.

11. The computer program according to claim 10, wherein the means of detecting the deviation of the resonance frequency from the center frequency set in the notch filter averages output results of multiplication after the multiplication of the signal of the extracted resonance frequency by the delay signal delaying the phase of the servo signal by 90 degrees.

* * * * *

UNITED STATES PATENT AND TRADEMARK OFFICE
CERTIFICATE OF CORRECTION

| | |
|---|---|
| PATENT NO. | : 7,031,096 B2 |
| APPLICATION NO. | : 10/645899 |
| DATED | : April 18, 2006 |
| INVENTOR(S) | : Masashi Kisaka |

It is certified that error appears in the above-identified patent and that said Letters Patent is hereby corrected as shown below:

Column 11, line 23, after "program", insert --embodied in a computer-readable medium--.

Column 12, line 15, after "of the", insert --means of--

Signed and Sealed this

Twelfth Day of September, 2006

JON W. DUDAS
*Director of the United States Patent and Trademark Office*